United States Patent
Rajadeva et al.

(10) Patent No.: US 7,908,511 B2
(45) Date of Patent: Mar. 15, 2011

(54) FILE REPLACEMENT IN SHARED FILE SYSTEM

(75) Inventors: Ahilan Rajadeva, Newburgh, NY (US); William J. Schoen, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 12/349,256

(22) Filed: Jan. 6, 2009

(65) Prior Publication Data

US 2010/0174941 A1 Jul. 8, 2010

(51) Int. Cl.
*G06F 11/00* (2006.01)

(52) U.S. Cl. .......................................................... 714/7
(58) Field of Classification Search ....................... 714/7
See application file for complete search history.

(56) References Cited

U.S. PATENT DOCUMENTS

| | | | |
|---|---|---|---|
| 6,122,629 A | 9/2000 | Walker et al. | |
| 6,247,139 B1 | 6/2001 | Walker et al. | |
| 6,249,879 B1 | 6/2001 | Walker et al. | |
| 6,567,811 B1 * | 5/2003 | Edwards et al. | 1/1 |
| 7,024,583 B2 * | 4/2006 | Nguyen et al. | 714/5 |
| 7,467,276 B1 * | 12/2008 | Kahn et al. | 711/166 |
| 7,506,213 B1 * | 3/2009 | Cabrera et al. | 714/42 |
| 7,739,546 B1 * | 6/2010 | Rodrigues et al. | 714/13 |
| 2007/0050675 A1 | 3/2007 | Yu | |
| 2007/0094489 A1 * | 4/2007 | Ota et al. | 713/2 |
| 2009/0113026 A1 * | 4/2009 | Nguyen et al. | 709/219 |
| 2009/0164840 A1 * | 6/2009 | Nagai et al. | 714/6 |
| 2010/0235615 A1 * | 9/2010 | Manczak et al. | 713/2 |

FOREIGN PATENT DOCUMENTS

EP 1764687 A1 3/2007

* cited by examiner

*Primary Examiner* — Bryce P Bonzo
(74) *Attorney, Agent, or Firm* — Cantor Colburn LLP; William Kinnaman

(57) ABSTRACT

A method for replacing a first root file system comprising, retrieving a second root file system, mounting the second root file system on a first system in a sysplex as the sysplex root file system, replacing sysplex root mount information associated with the first root file system with sysplex root mount information associated with the mounted second root file system, updating a root on the first system to point to the mounted second root file system, invalidating the first root file system on the first system, updating a first file system to point to the mounted second root file system in the first system, updating an active process with the sysplex root mount information associated with the mounted second root file system, and unmounting the first root file system from the first system.

18 Claims, 3 Drawing Sheets

FILE REPLACEMENT IN SHARED FILE SYSTEM

BACKGROUND

The embodiments relate generally to data processing, and more specifically to accessing and storing data in a Parallel Sysplex multi-system.

Parallel Sysplex multi-systems use a number of system processors in communication that read and write data stored in a data storage system (i.e., memory devices). The multiple system processors offer system redundancy such that if a particular system processor fails, other system processors may perform similar tasks.

The data is organized hierarchically in file systems that are accessible by the system processors. The file systems are organized and mounted to a system hierarchy tree and are accessible by the system processors. The system hierarchy tree includes a sysplex root file system that is mounted at the base of the system hierarchy tree. A failure of the sysplex root file system may render any file systems mounted to the system hierarchy tree inaccessible.

SUMMARY

The shortcomings of the prior art are overcome and additional advantages are achieved through an exemplary method for replacing a first root file system comprising, retrieving a second root file system, mounting the second root file system on a first system in a sysplex as the sysplex root file system, replacing sysplex root mount information associated with the first root file system with sysplex root mount information associated with the mounted second root file system, updating a root on the first system to point to the mounted second root file system, invalidating the first root file system on the first system, updating a first file system to point to the mounted second root file system in the first system, updating an active process with the sysplex root mount information associated with the mounted second root file system, and unmounting the first root file system from the first system.

A system comprising, a first system, a sysplex file system including a first root file system and a second root file system, and a processor operative to initiate a root file system replacement comprising, retrieve the second root file system, mount the second root file system on the first system in a sysplex as the sysplex root file system, replace sysplex root mount information associated with the first root file system with sysplex root mount information associated with the mounted second root file system, update a root on the first system to point to the mounted second root file system, invalidate the first root file system on the first system, update a first file system to point to the mounted second root file system in the first system, update an active process with the sysplex root mount information associated with the mounted second root file system, and unmount the first root file system from the first system.

A computer readable medium operative to store the instructions for replacing a first root file system comprising, retrieving a second root file system, mounting the second root file system on a first system in a sysplex as the sysplex root file system, replacing sysplex root mount information associated with the first root file system with sysplex root mount information associated with the mounted second root file system, updating a root on the first system to point to the mounted second root file system, invalidating the first root file system on the first system, updating a first file system to point to the mounted second root file system in the first system, updating an active process with the sysplex root mount information associated with the mounted second root file system, and unmounting the first root file system from the first system.

DETAILED DESCRIPTION

Systems and methods involving data deduplication are provided. Several exemplary systems and methods are described.

Figure 1:
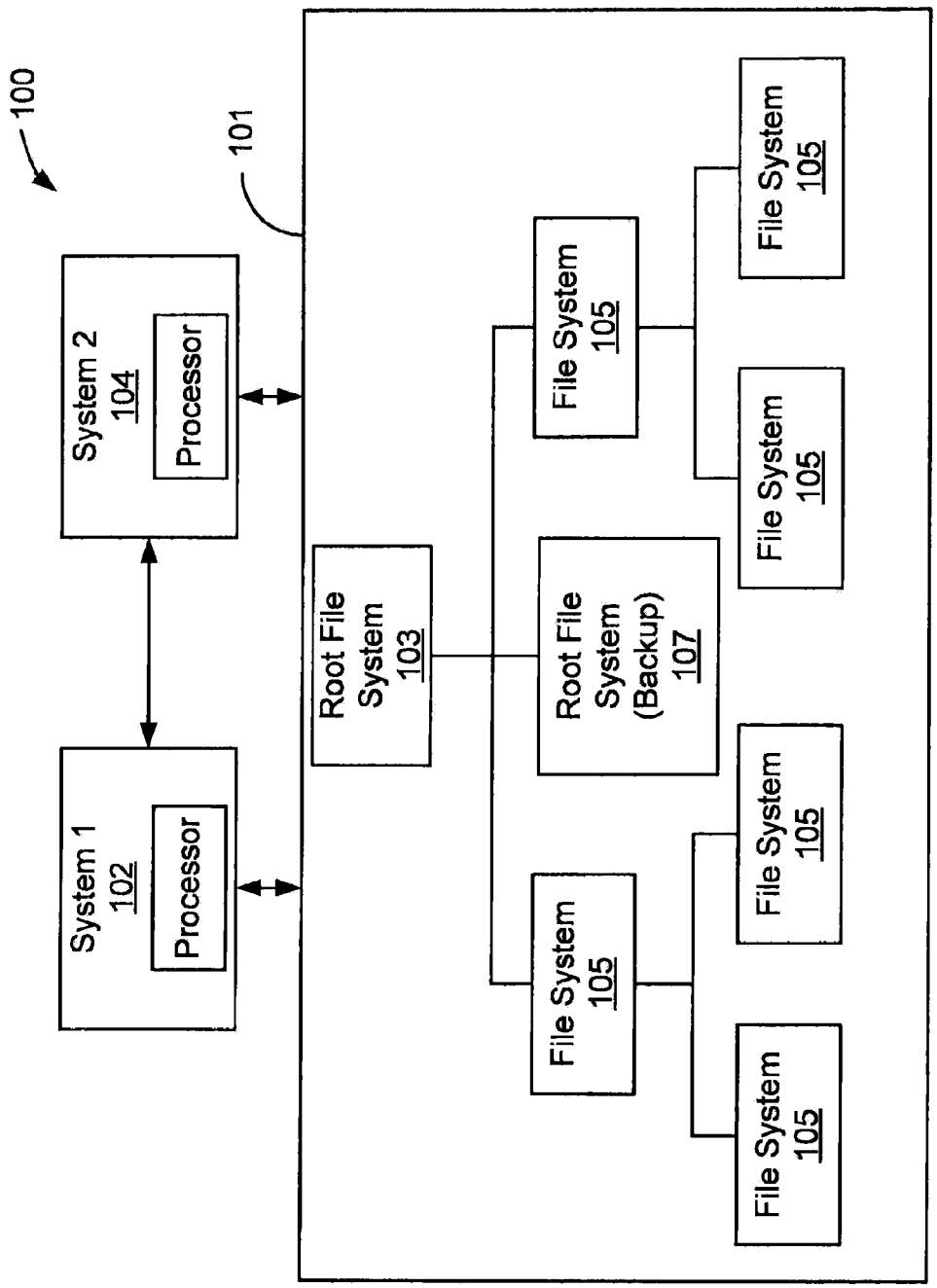
FIG. 1 illustrates an example of a portion of a Parallel Sysplex multi-system

FIG. 1 illustrates an example of a portion of a Parallel Sysplex multi-system 100 including a system hierarchy tree 101. The Parallel Sysplex multi-system 100 includes a system 1 102 and a system 2 104 that include processors that access data from the system hierarchy tree 101. The system hierarchy tree 101 includes a sysplex root file system 103 mounted at the base of the system hierarchy tree 101 and a plurality of file systems 105 mounted to branches of the system hierarchy tree 101.

In a Parallel Sysplex multi-system, the system files are mounted to the system hierarchy tree to allow access to the file systems. Typically, the system hierarchy tree is defined, the sysplex root file system is mounted to the system hierarchy tree, and the other file systems are then mounted to the system hierarchy tree. If the sysplex root file system fails (e.g., becomes corrupted or becomes inaccessible), the other file systems mounted to the system hierarchy tree are rendered unavailable. To replace a failed sysplex root file, all applications that use the file systems are halted; the system users are logged off the system; the mounted file systems are unmounted up to the sysplex root file system; and the failed sysplex root file system is unmounted; a functioning sysplex root file is mounted; and the file systems are remounted in the system hierarchy tree. Once the file systems are remounted, the applications may be restarted, and the users may log on to the system. This method is both inefficient in practice and results in considerable system down time.

A method that recognizes and replaces a failed sysplex root file system with a functioning sysplex root file system that does not result in the unmounting and remounting of all of the file systems in the system hierarchy tree is described below.

Referring to FIG. 1, to dynamically replace the sysplex root file system 103, a backup of the sysplex root file system 103 is maintained. This illustrated embodiment shows the backup sysplex root file system 107 mounted to the system hierarchy tree 101. In operation, as the sysplex root file system 103 is modified, the backup sysplex root file system 107 is similarly modified. The modification of the backup sysplex root file system 107 may be performed manually by a user or automatically such that the backup sysplex root file system 107 is similar to the sysplex root file system 103 while the system 100 is operating.

Figure 2A:
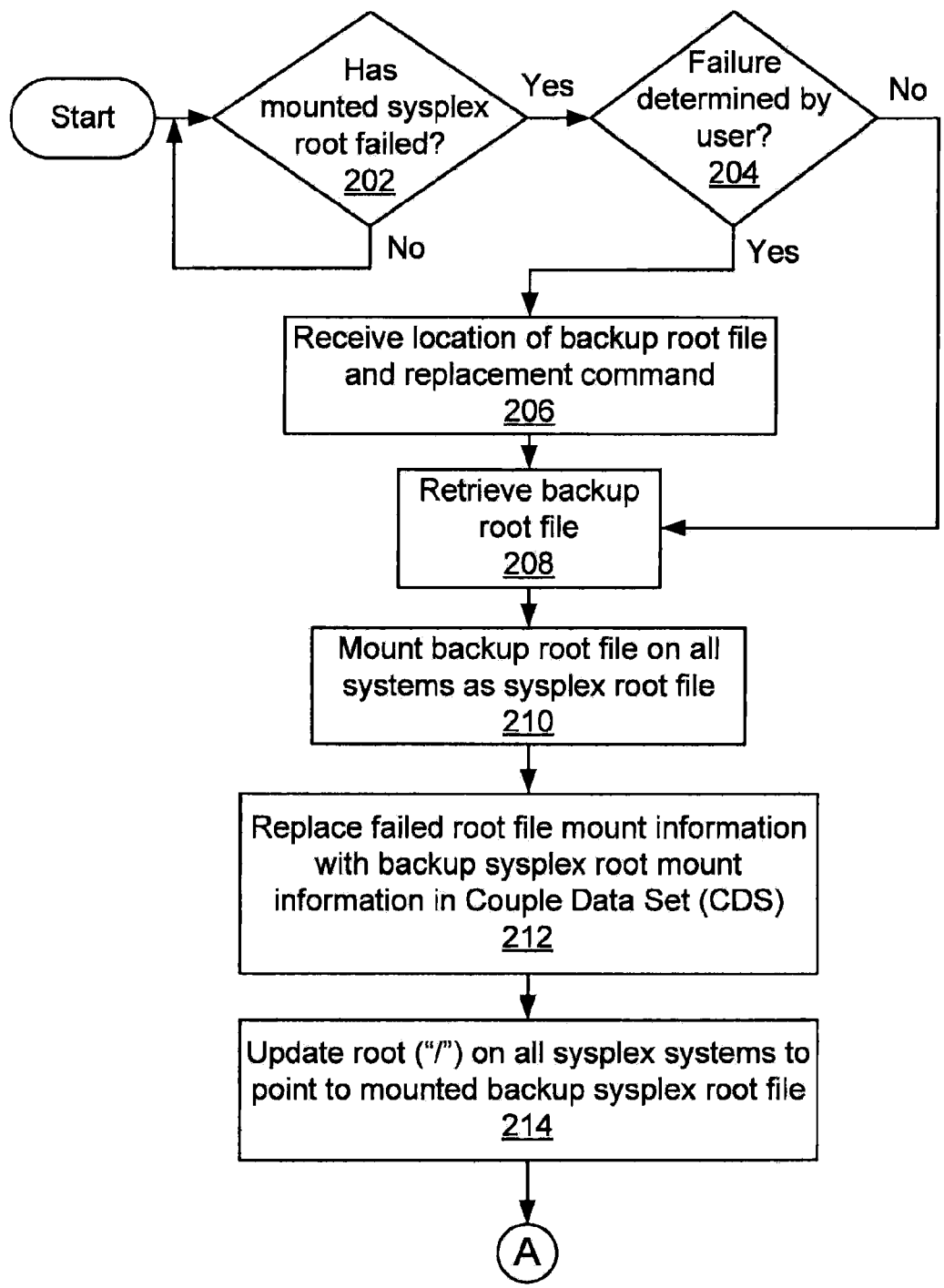
FIGS. 2A-2B show a block diagram illustrating an exemplary a method for dynamically replacing a failed sysplex root file system
Figure 2B:
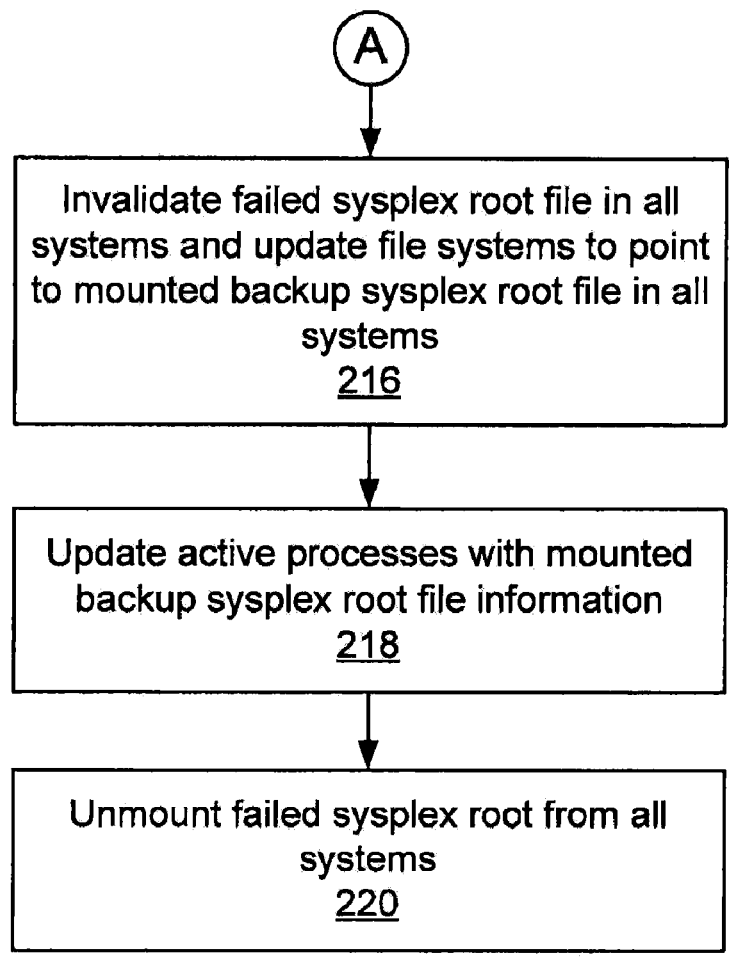

FIGS. 2A-2B show a block diagram illustrating an exemplary a method for dynamically replacing a failed sysplex root file system with a functioning sysplex root file system. Block 202 determines whether a mounted (and active) sysplex root file has failed. If the failure is determined by a user in block 204, the user may manually locate a backup sysplex root file; designate the backup sysplex root file; and send a replacement command. If the failure of the sysplex root file is determined automatically (e.g., by a processor), the processor locates the backup sysplex root file and retrieves the backup root file in block 208. In block 210, the backup sysplex root file is mounted as the sysplex root on all systems in the shared file system configuration. The mounting on all systems may be performed using cross-system coupling facility (XCF) messaging to all of the systems directing the systems to mount the backup sysplex root file as the sysplex root file. In block 212, the sysplex root mount information in the Couple Data Set (CDS) from the failed sysplex root file is replaced with sysplex root mount information from the mounted backup sysplex root file. In block 214, the root ("/") is updated on all systems in the sysplex to point to the mounted backup sysplex root file. In block 216, the failed sysplex root file is invalidated on all systems; and the file systems (mounted beneath the root) are updated to point to the mounted backup sysplex root file information in all of the systems. The control blocks are updated as necessary using serialization. All active processes are updated with the mounted backup sysplex root file information including the current working directory (CWD) and the current root directory (CRD) in all systems in the shared file system configuration. The active processes may be updated by, for example, running the file system user process table control block chain with process serialization, and locating and updating the CWD and the CRD in block 218. In block 220 the failed sysplex root file is unmounted from all systems in the sysplex.

The technical effects and benefits of the above-described systems and methods provide a method for replacing a sysplex root file while a sysplex system is running.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for replacing a first root file system comprising:
    retrieving a second root file system;
    mounting the second root file system on a first system in a sysplex as the sysplex root file system;
    replacing sysplex root mount information associated with the first root file system with sysplex root mount information associated with the mounted second root file system;
    updating a root on the first system to point to the mounted second root file system;
    invalidating the first root file system on the first system;
    updating a first file system to point to the mounted second root file system in the first system;
    updating an active process with the sysplex root mount information associated with the mounted second root file system; and
    unmounting the first root file system from the first system.

2. The method of claim 1, wherein the method further comprises:
    determining whether the first root file system has failed; and
    sending an instruction to initiate the root file system replacement method responsive to determining that the first root file system has failed.

3. The method of claim 1, wherein the method further comprises:
    receiving a first instruction to replace a root file system;
    receiving a location of the second root file system from a user responsive to receiving the first instruction to replace the root file system; and
    sending an instruction to initiate the root file system replacement method responsive to receiving the location of the second root file system from the user.

4. The method of claim 1, wherein the second root file system is mounted on the first system using cross-system coupling facility (XCF) messaging.

5. The method of claim 1, wherein the sysplex root mount information associated with the mounted second root file system is located in a couple data set (CDS).

6. The method of claim 1, wherein the active process is updated by running a file system user process table control block chain with process serialization.

7. A system comprising:
    a first system;
    a sysplex file system including a first root file system and a second root file system; and
    a processor operative to initiate a root file system replacement comprising, retrieve the second root file system, mount the second root file system on the first system in a sysplex as the sysplex root file system, replace sysplex root mount information associated with the first root file system with sysplex root mount information associated with the mounted second root file system, update a root on the first system to point to the mounted second root file system, invalidate the first root file system on the first system, update a first file system to point to the mounted second root file system in the first system, update an active process with the sysplex root mount information associated with the mounted second root file system, and unmount the first root file system from the first system.

8. The system of claim 7, wherein the processor is further operative to determine whether the first root file system has failed, and initiate the root file system replacement method responsive to determining that the first root file system has failed.

9. The system of claim 7, wherein the processor is further operative to receive a first instruction to replace a root file system, receive a location of the second root file system from a user responsive to receiving the first instruction to replace the root file system, and initiate the root file system replacement method responsive to receiving the location of the second root file system from the user.

10. The system of claim 7, wherein the second root file system is mounted on the first system using cross-system coupling facility (XCF) messaging.

11. The system of claim 7, wherein the sysplex root mount information associated with the mounted second root file system is located in a couple data set (CDS).

12. The system of claim 7, wherein the active process is updated by running a file system user process table control block chain with process serialization.

13. A computer readable medium operative to store the instructions for replacing a first root file system comprising:
   retrieving a second root file system;
   mounting the second root file system on a first system in a sysplex as the sysplex root file system;
   replacing sysplex root mount information associated with the first root file system with sysplex root mount information associated with the mounted second root file system;
   updating a root on the first system to point to the mounted second root file system;
   invalidating the first root file system on the first system;
   updating a first file system to point to the mounted second root file system in the first system;
   updating an active process with the sysplex root mount information associated with the mounted second root file system; and
   unmounting the first root file system from the first system.

14. The computer readable medium of claim 13, wherein the instructions further comprise:
   determining whether the first root file system has failed; and
   sending an instruction to initiate the root file system replacement method responsive to determining that the first root file system has failed.

15. The computer readable medium of claim 13, wherein the instructions further comprise:
   receiving a first instruction to replace a root file system;
   receiving a location of the second root file system from a user responsive to receiving the first instruction to replace the root file system; and
   sending an instruction to initiate the root file system replacement method responsive to receiving the location of the second root file system from the user.

16. The computer readable medium of claim 13, wherein the second root file system is mounted on the first system using XCF messaging.

17. The computer readable medium of claim 13, wherein the sysplex root mount information associated with the mounted second root file system is located in a couple data set (CDS).

18. The computer readable medium of claim 13, wherein the active process is updated by running a file system user process table control block chain with process serialization.

* * * * *